FIG. 1

INVENTORS
KARL MARTIN ALM
BROR ERLAND OGHAMMAR

Jan. 18, 1955 K. M. ALM ET AL 2,699,630
APPARATUS FOR FORMING THE ENDS OF GLASS TUBES
Filed May 1, 1951 9 Sheets-Sheet 7

Jan. 18, 1955  K. M. ALM ET AL  2,699,630
APPARATUS FOR FORMING THE ENDS OF GLASS TUBES
Filed May 1, 1951  9 Sheets-Sheet 9

United States Patent Office 2,699,630
Patented Jan. 18, 1955

2,699,630

APPARATUS FOR FORMING THE ENDS OF GLASS TUBES

Karl Martin Alm, Enskede, and Bror Erland Oghammar, Stockholm, Sweden, assignors to Lumalampan Aktiebolag, Stockholm, Sweden, a corporation of Sweden Application May 1, 1951, Serial No. 223,966

Claims priority, application Sweden May 4, 1950

28 Claims. (Cl. 49—7)

This invention relates to glass working and more particularly to a device for shaping the ends of glass tubes while they are rotating about their axes and to a machine equipped with a plurality of such devices for increased production.

One important object of the invention is to ensure that an accurately shaped end profile is obtained on a glass tube when one or both ends of the tube are machined by means of suitable tools while the tube is rotating. As will be described more in detail, the difficulties met with are considerable in regard to end-shaping a tube of some length to an exact end profile, and the purpose of this invention is above all to provide in such cases the possibility of attaining accurate end shaping.

In order to hold the tubes firmly during machining operations, the device, according to this invention, includes two holders clamping the tube within its ends and together forming a holder unit, which term subsequently will be used to designate the pair of holders. It is characteristic of this invention that one of the holders in the unit is equipped with contact members so arranged for holding the tube that the latter is fixed against axial as well as against radial movement, whereas the clamping members of the other holder are arranged to fix the tube against radial movement only, and both holders are so arranged that the tube can be rotated about its axis in such a way that both tube ends are exposed for machining operations. An important point is that the tube is to be gripped close to its ends so that during machining the tube will be thus held centered at both ends by the holders, only one of which, however, fixes the tube longitudinally to prevent axial dislocation. It is sufficient to fix the tube against axial movement at one end only, even if both ends are to be machined. Owing to the arrangement proposed for holding the tube ends, a safe holder design for the above mentioned purposes is possible, which also is simple in construction and facilitates insertion and removal of the tubes.

A simple but efficient holder for the tube end which is to be fixed against axial movement is obtained by providing a holder completely surrounding the tube so that the tube can only be inserted axially into the holder. At the same time, the other holder of the unit is provided with a radial opening which permits insertion of the tube into the holder from the side.

According to a preferred design, the holder fixing the tube against axial movement as well as against radial movement consists of a number of contact members holding the tube in position and arranged as radially movable clamping elements on a ring-shaped member, which can be rotated in the holder and which serves as a turning device for the tube.

In particular it is suggested that the contact members of the holder fixing the tube against axial as well as against radial movement be attached to the holder and attaching ring with play in such a manner that they are easily movable axially to permit slight dislocation of the tube without sliding in relation to the contact points between the members and the tube.

With regard to the other holder, which only fixes the tube against radial movement, it consists, according to a preferred design, of three freely turnable rollers, one of these rollers being retractable with respect to the two other rollers in order to permit insertion and removal of the tube radially.

By utilizing a number of holder units as described above a machine for shaping glass tube ends can be constructed. According to this invention, such a machine is provided with a rotatable support or turret for a number of holder units of the type described for tubes supported in parallel relation to each other and evenly distributed around the circumference of the turret. Further the machine includes a number of work stations with tools for machining the tube ends at one end at least of the turret and with means for rotating the turret so that every tube carried thereby is moved successively to these work stations and may be machined at each station by means of the tools available at that station.

In a special design of such a machine, the envelopes of luminous tubes and similar tubes can be end-shaped rapidly and with precision. Such a machine comprises at the respective work stations machining tools so arranged at both ends of the turret that opposite ends of every tube in successive stations are cut to provide a tube of accurate length, that the cut ends are softened and constricted and that the constricted ends, in addition to this, are, if necessary, subjected to a temperate cooling. Suitable mutually identical and simultaneously working tools are provided at both ends of the machining station in question.

The invention will be described in the following with such a machine for shaping the ends of luminous tubes as an example and with reference to the enclosed drawing showing the machine. In connection with this description further details covered by the invention will be described more in detail. It is to be understood, however, that the invention is not limited to such a machine for simultaneous machining of a number of luminous tube envelopes at both ends, but also comprises not only devices for shaping the ends of individual tubes of some length at one end or both ends, but also end shaping machines for other tubes than luminous tube envelopes with shaping of one end or of both ends, in the latter case independently of whether both ends are shaped at different stations or simultaneously.

The example of construction mentioned, which is now to be described is shown in enclosed drawing.

Figure 13:
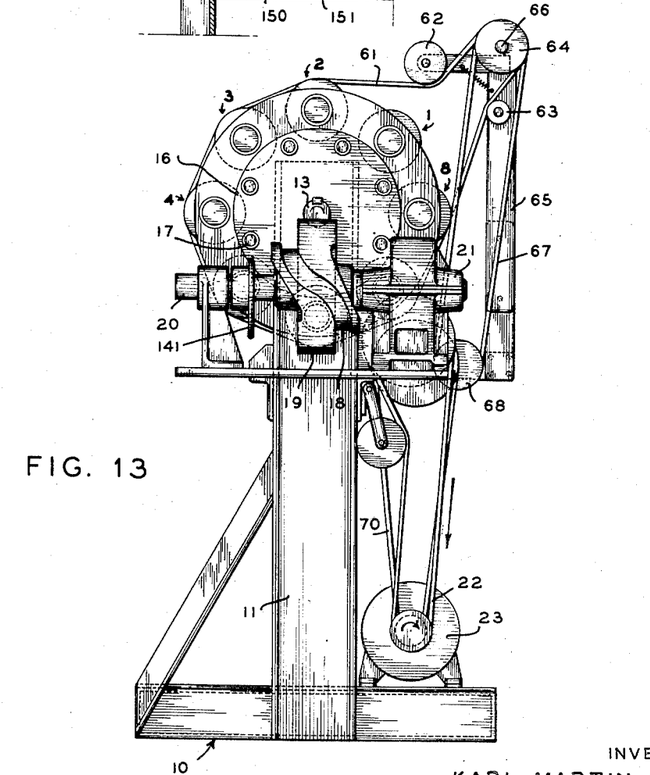
Fig. 13 shows the member for bringing about gradual movement of the tubes between the working stations, as seen from the left side of the machine.

The machine stand 10 (Figs. 1, 2 and 13) is shown built up of a number of suitably assembled bars and a pair of U-section bars 11, 12, arranged to support the main shaft 13 of the machine. In each upper end of the bars 11 and 12 is inserted a bearing bushing, 14 and 15 respectively, for the shaft, and to the shaft end protruding to the left is attached a disc 16 fitted with a number of protruding pins or rollers 17, corresponding to the number of working stations. The pins or rollers 17, in a conventional way, are engaged in turn by an axial cam 18 arranged on a cylinder 19 (Fig. 13). The cylinder in its turn is attached to a shaft 20, which by means of a worm gear 21 and a belt transmission 22 is driven by an electric motor 23, which is the driving means common to the whole machine.

On main shaft 13 is arranged a pair of hub sleeves, 24 and 25 respectively, fitted with discs, 26 and 27 respectively, which serve as carriers for the clamping members, 29 and 30 respectively, for the tubes 28. The left hub sleeve 24 is rigidly attached and carries by means of its disc 26 holders 29, which clamp tubes 28 in position against axial as well as against radial movement. The other hub sleeve 25, which by means of its disc 27 carries the holders 30, which keep tubes 28 in position against radial movement only, is movable or adjustable axially, for reasons explained below.

The left disc 26 (Figs. 4 and 5) is equipped with a number of threaded holes 31 corresponding to the number of holders 29 on the disc. Into each hole is screwed a sleeve 32, which is provided with a flange 33 serving as a support for a tube holder 29. This tube holder consists of four link-shaped contact members 34, pivotally mounted by pins 35, arranged on a ring 36, which in turn is rotatably mounted on sleeve 32 by means of balls 37. In order to move contact members 34 to and from the centre of this tube holder, there are four more links 38 pivotally attached to contact members 34 and 39. The outer ends of links 38 are pivotally mounted on pins 40, attached to ring 41, which is rotatably mounted on ring 36. If ring 41 is turned in relation to ring 36, the holder, as will be easily understood, will open or close. Springs 42 and 43 urge the holder toward closed position.

Figures 4, 5:
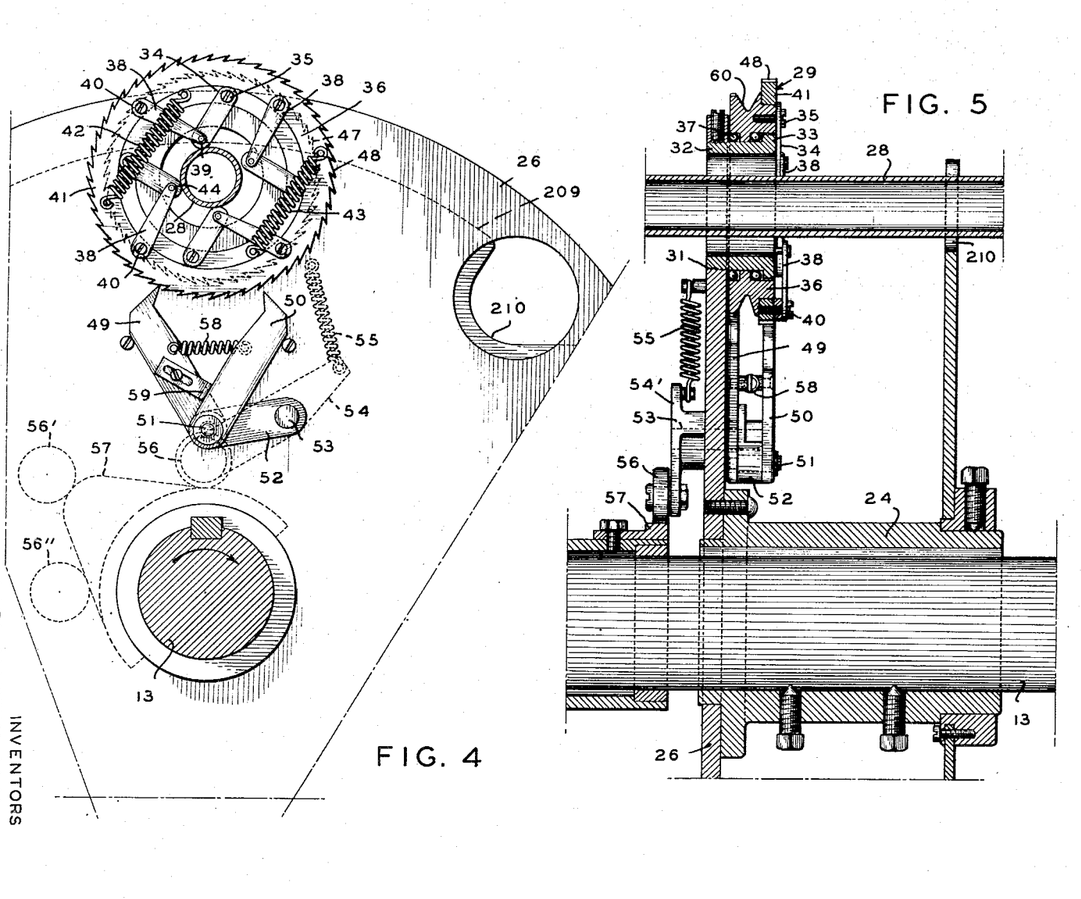
Fig. 4 is an end view (seen from inside the machine) of a holder for holding the tube against axial as well as against radial movement.
Fig. 5 is a cross section of the same holder.

In order to open the holders, rings 36, 41 are rotated in the opposite direction to that caused by springs 42, 43. The rings are formed at their circumference as toothed wheels 47 and 48, with which a pair of pawls 49, 50 for each holder 29 is made to engage. These pawls are pivotally mounted on a pin 51, which is carried by an arm 52, which in turn is pivotally attached by a pin 53 to disc 26. To the other end of the pin 53 there is also attached an arm 54, one end of which is connected to a tension spring 55 attached to disc 26, and the other end is provided with a roller 56. When main shaft 13 is rotating, roller 56, when approaching station 1 for insertion and removal of tubes, engages cam 57 which is stationary with relation to axle 13. The roller 56 is shown in dotted lines at 56' and 56" in the different positions occupied when in engagement with cam 57. Pawls 49, 50 are thereby moved towards the toothed circumferences 47, 48 of the rings to be engaged therewith and will turn rings 36, 41 against the force of springs 42, 43 so that the holders are opened and tubes 28 can be easily removed and inserted in axial direction. Between the pawls, a tension spring 58 is arranged, and on one pawl 49, there is an adjustable stop 59 co-operating with the other pawl 50 in order to limit the movement of the pawls towards each other.

Moreover, rings 36 are each provided with a groove 60, and around the circumference of all these rings, with the exception of the ring situated at tube insertion and removal station 1, is trained a belt 61, which via a pair of interrupting pulleys 62 and 63 runs over a belt wheel 64, which like the interrupting pulleys 62 and 63 is supported by an arm 65, which is adjustably secured to stand 10. On the same pin 66 and attached to belt wheel 64 another belt wheel 67 is driven by wheel 68, which in turn is driven via a toothed gear 69 and a belt transmission 70 by motor 23.

Figure 7:
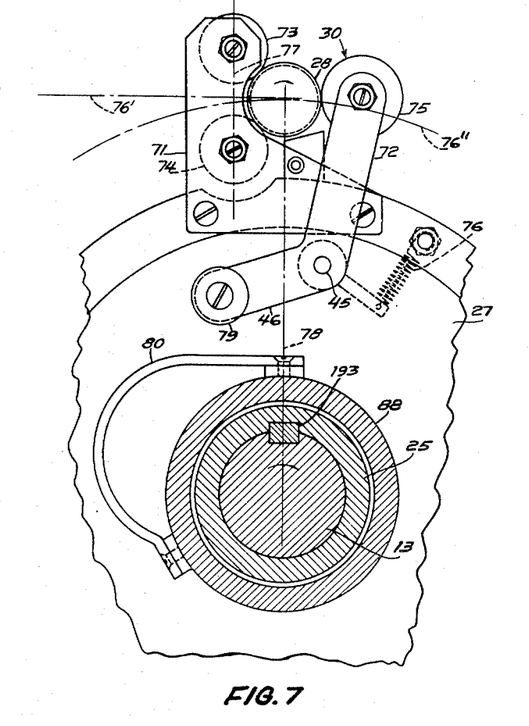
Fig. 7 is an end view (seen from the right side of the machine) of a holder for holding the tube against radial movement only.

Holders 30 (Figs. 2, 7 and 8), which keep the tubes in position against radial movement only with respect to the holder and main shaft 13, consist each of a plate 71 attached firmly to disc 27 and an arm 72 pivotally mounted on disc 27 in such a way that plate 71 supports two rollers 73 and 74 and the end of the arm 72 a roller 75, these rollers suitably consisting of ball bearings with a movable outer ring. By a tension spring 76 arm 72 is drawn towards plate 71. The two rollers 73, 74 of holder 30, which are firmly attached to plate 71, are so arranged that they are positioned symmetrically around tangent 76' to the path 76", along which the tubes move when passing through the machine. Line 77 through the centre of these rollers 73, 74 is thus parallel with radius 78 through the centre which is obtained for a tube of average diameter. The centre of a tube with a diameter deviating somewhat from the average will thus be situated almost exactly on the same circle 76", if the fixed rollers are placed symmetrically around the tangent of this circle, which offers a great advantage in neck shaping portions.

Arm 72, which is pivoted at 45 on disc 27, is extended to another arm 46, the outer end of which is provided with a roller 79. In position 1 for insertion and removal of a tube, this roller engages stationary cam 80, which results in arm 72 turning clockwise as viewed in Fig. 7 and holder 30 opens so that tubes 28 can easily be removed or inserted into this holder.

Figure 6:
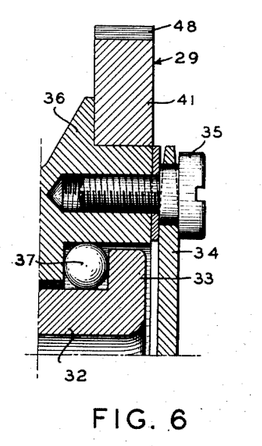
Fig. 6 is a detail of this holder.

The possibility of using a holder 30 of the last mentioned type is based on the fact that tubes 28 have a fixed nominal diameter with rather small deviations up and down, for instance 38±1.5 mm. The tube centre will thus, as already pointed out, move in holder 30. This means that an exact alignment of any individual tube 28 only can occur by mere chance. But if the central axis of the tube forms an angle with the central axis of holder 29 to the left, the contact points of clamping members 39 and tube 28, as will be easily understood, will slide forward and back axially when the holder or tube is turned. As a result tube 28 will move axially to the right or left. This motion is, of course, detrimental to accurate shaping of the ends. The travelling movement can, however, be eliminated by the following arrangement. The ends of links 34, 38, situated under screw heads 35, 40, on the holders, are chamfered, which permits slight tilting of the links in the axial direction of the tubes (Fig. 6). If the tube axis is oblique with regard to the holder 30, the tube will, as is easily understood, be moved axially to the right or left by the circumference of rollers 73, 74 and 75. Therefore, springs 42, 43 acting upon clamping links 34 for preventing axial as well as radial movement of the tube 28, will exert a greater clamping force than the corresponding spring 76 of holder 30 for preventing radial movement only. Links 34, 38 can thus hold the tube without sliding of the contact points 44 on these links along the tube.

Figure 14:
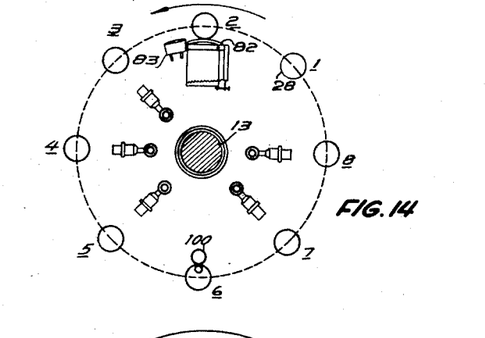
Fig. 14 shows the working stations at one end of the machine, diagrammatically, as seen from the left side of the machine.
Figure 15:
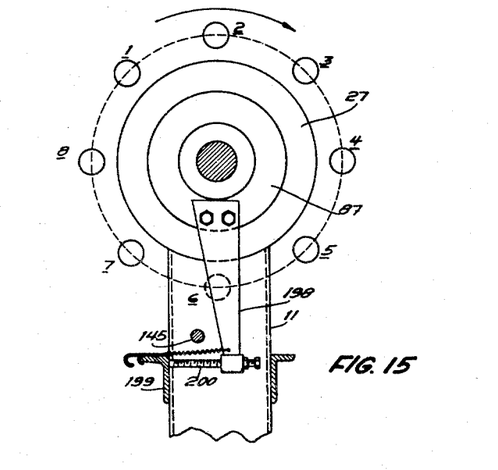
Fig. 15 shows a detent for preventing the rim of burners and cutting-off device at the right side of the machine from following the rotation of the main shaft.

The machine shown has eight stations, 1 to 8. The guide groove 18 of the cylinder cam 19 is of such shape that the tubes remain resting at the different stations during a certain time sufficient for machining, while movement from station to station is comparatively fast. The tube inserted into the machine at station 1 moves first to station 2 (Figs. 2 and 14), where the tube ends 8 are heated prior to cutting off. During the movement from station 2 to station 3 the tube passes cutting devices 82, 83. Stations 3 is a preheating point for the tube ends. Softening of the tube ends is completed at stations 4 and 5. At station 6 end shaping is effected, whereupon the shaped ends are subjected to temperate cooling at stations 7 and 8. At station 1 insertion and removal of the tubes is effected and thus there occurs the above described automatic opening of the tube holders.

Figure 2:
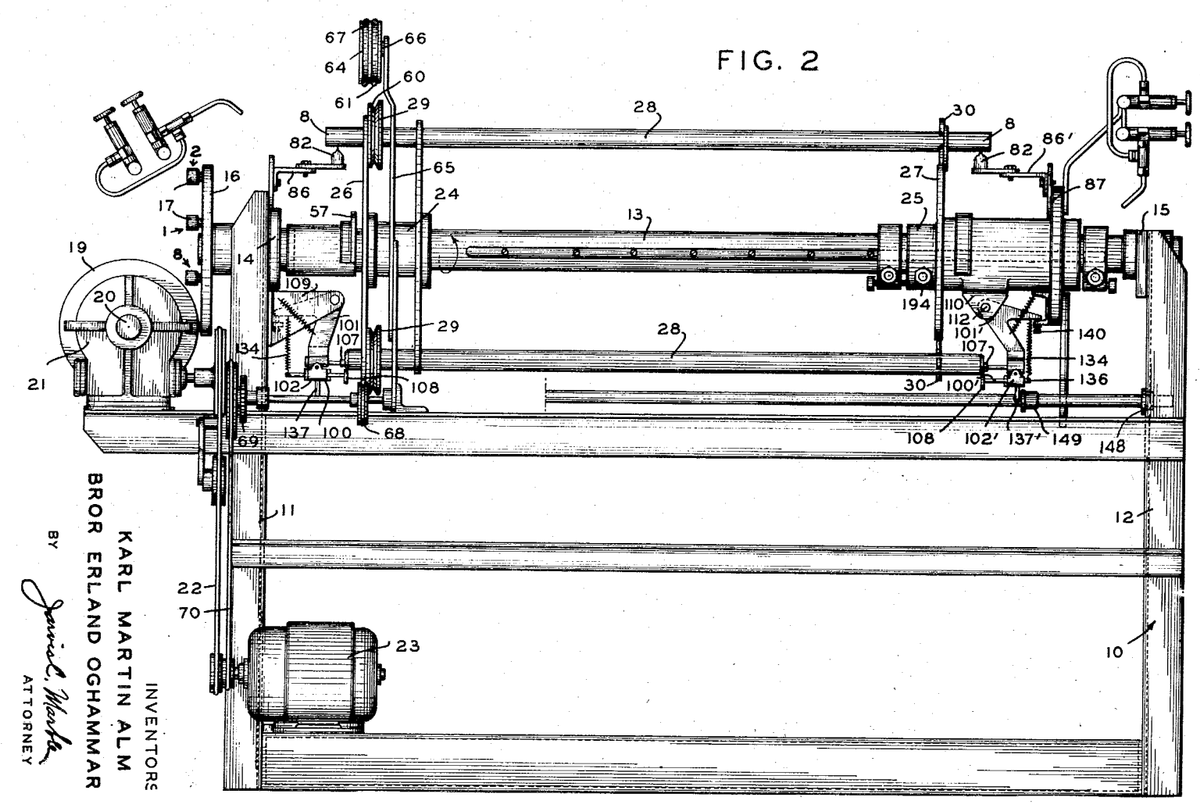
Fig. 2 is a longitudinal view from the front.

The cutting-off burner 82 (Figs. 9, 10 and 14) at station 2, suitably supplied with a mixture of gas and oxygen, has a long, narrow opening 84 for the intensely hot flame situated in a plane at right angles with the axis of tube 28. The burner is arranged on an angle shaped holder 85, which by means of bolts is attached to a bracket 86 (Fig. 2). Bracket 86 to the left is attached to support 11, and bracket 86' to the right to a flange 87, which is arranged on the main shaft 13 but does not rotate therewith. For adjustment of the position of burner 82 the bolt holes of holder 85 and bracket 86 are oblong.

Figure 9:
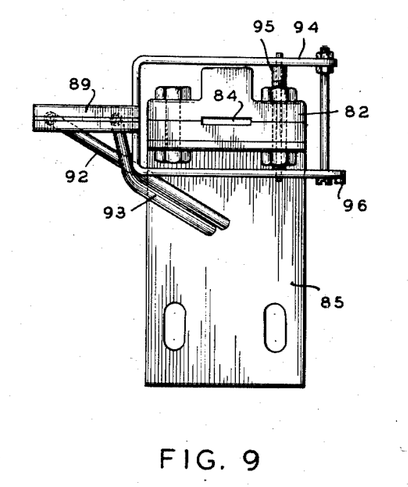
Fig. 9 is a cutting-off device (to the right) for the tube seen from above.
Figure 10:
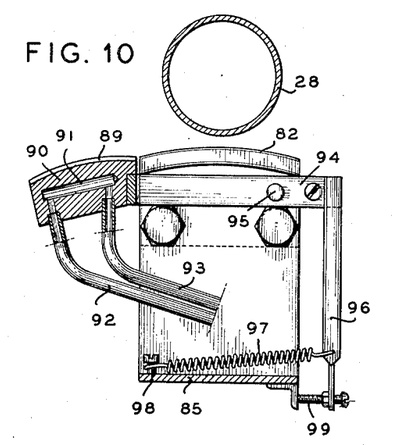
Fig. 10 shows the cutting-off device partly in section, seen from inside the machine.

Cutting-off device 83 consists of a curved edge 89 arranged in the plane of the flame and suitably of tungsten carbide or similar material, attached to a plate 90 set on edge. Plate 90 is provided with an internal cavity 91, which is connected to supply and discharge pipes, 92 and 93 respectively, for cooling water. Plate 90 is supported by a fork 94 which is pivoted on a pin 95 attached in the burner housing 82 and has a downwardly extending arm 96. To the arm 96 is attached one end of a tension spring 97, the other end of which is held by screw stud 98 on holder 85. By means of the spring 97 edge 89 is held in a lifted position so that the tube rotating round its axis when moved from station to station is caused to touch the edge in the zone heated by the flame of burner 82 and of very short extension axially, by which the tube end is removed owing to stresses generated in the glass by the sudden cooling thereof. The position of the edge 89 is adjustable vertically by means of adjusting screw 99 on arm 96.

The neck shaping devices 100, 100' (Figs. 1, 2 and 11) for the tube ends softened by the burners at stations 3, 4 and 5 consist each of an arm 101, 101', which can be swung against the tube in a plane which approximately passes through main shaft 13, the lower end of this arm being equipped with another arm 102, 102', attached by a joint. These two arms are provided with shaping devices 107, 108, for constricting the tube end.

Figure 8:
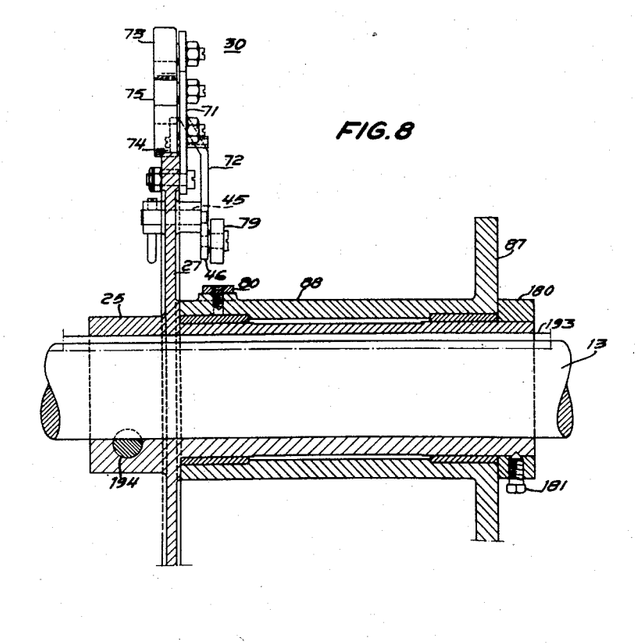
Fig. 8 is a side elevation of this holder with members for moving the rim of such holders.

The shaping device 100 to the left in Fig. 2 is attached to a bracket 109 arranged on beam 11 in such a manner that it can be swung, while shaping device 100' to the right is attached for being swung to a projection 110 arranged on a hub 88 journalled on hub sleeve 25 (Fig. 8).

Figure 11:
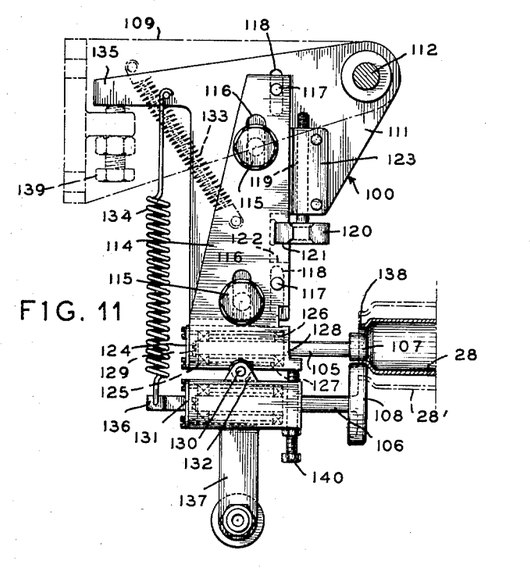
Fig. 11 shows a neck shaping device (to the left) for the tube in side view.

Shaping device 100 to the left will now be described in detail with reference to Fig. 11. On bracket 109 there is an arm 111 which is pivoted on a pin 112. On arm 111 is a plate 114, attached by means of bolts 115, in such a manner that the holes 116 in the plate for the bolts are oblong to permit adjustment of the plate vertically. By movement vertically it is possible to adjust the shaping device in accordance with different tube and neck diameters. Fig. 11 shows a pair of tubes, 28 and 28', of different tube and neck diameters, the larger one of which, 28', is shown in dotted lines. Plate 114 is during this movement guided by a pair of pins 117 which engage in grooves 118 in arm 111. The movement is effected by means of an adjusting screw 119, the head 120 of which is fitted into a recess 121 in plate 114; arm 111 has a longer recess 122 situated below same. Screw 119 goes through a nut 123 attached to the arm 111.

The lower part of plate 114 is shaped as a bearing case 124 for a pair of ball bearings 125, 126 with a spacing sleeve 127 between them. Into the ball bearings is inserted shaft 105 for the internal shaping roller 107, this shaft being held in position by shoulder 128 and a locking-disc 129. Through the lower part of the bearing case passes a pin 130, on which a bearing case 131 for the outer shaping roller 108 is arranged by means of a pair of hangers 132. The arrangement of this bearing case with regard to supporting shaft 106 for the corresponding shaping roller 108 is in keeping with that of the bearing case just described.

Between the bracket 109 and arm 111 a tension spring 133 is arranged, and a similar tension spring 134 is arranged between a projection 135 on arm 111 and a pin 136 on the lower bearing case 131, the latter one, 134 of these springs being of larger dimensions than the former, 133. On the lower bearing case 131, there is, in addition, a downwardly extending arm 137, by means of which the shaping device can be swung in towards the tube end 138 in the manner described below. Owing to the fact that one spring is weaker than the other one, the inner shaping roller 107 will be the first to arrive at shaping position in the tube end, whereupon the outer shaping roller 108 is swung up towards the outside of the tube end. On bracket 109 is an adjusting screw 139, which co-operates with the projecting part 135 of arm 111 and serves as an adjustable stop when the shaping rollers are moved in towards the tube in its axial direction. Between the bearing cases 124 and 131 there is another adjusting screw, 140, which acts to regulate the distance between rollers 107 and 108 so that it somewhat exceeds the tube wall thickness.

It is suitable to provide for an inner shaping roller 107 with a very small diameter as compared with that of the outer roller 108. The inner roller may also be omitted, as the glass will be thrown outward from the tube axis by centrifugal force.

Figure 12:
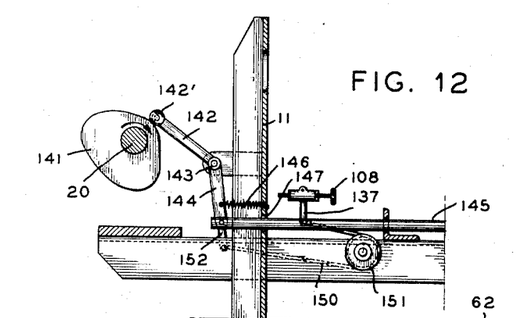
Fig. 12 shows a detail of an actuating member for the neck shaping devices, as seen from the front of the machine.

Arms 137, 137' are acted upon by the following device (Figs. 2 and 12). On shaft 20 there is arranged a cam 141, on which runs a cam roller 142', attached to one end 142 of an angular arm pivoted on pin 143, the other end 144 of this arm being pivotally attached to a horizontal rod 145. The cam roller is forced against the cam by means of a tension spring 146. The rod passes through an aperture 147 in the left beam 11 and is supported by means of a bushing 148 in the right beam 12. Close to the right shaping device 100' a flanged hub 149 is placed on the rod which, when the rod is pulled to the left moves this shaping device towards the tube end in question, by engagement of the flange 149 with the arm 137'. To the end of arm 137 of the left shaping device 100 is attached one end of a chain 150, which is trained over a wheel 151 and its other end is attached to an arm 152, which is rigidly connected with angular arm 144.

Figure 3:
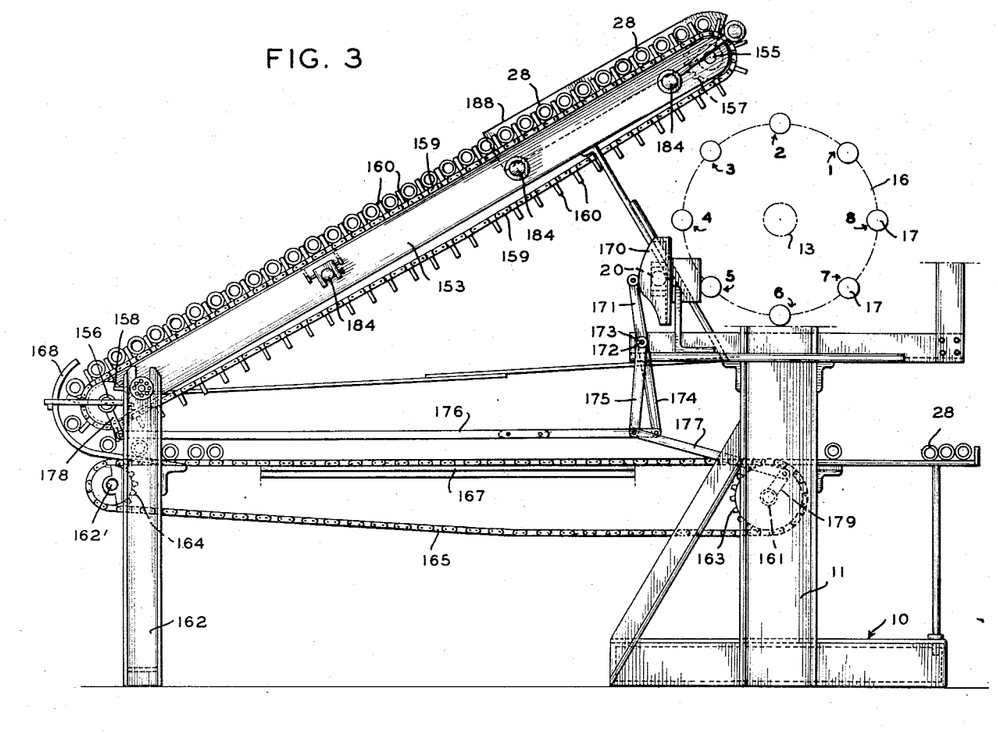
Fig. 3 is an end view of the machine as seen from the left side of the machine.

After the tube has passed stations 7 and 8 for temperate cooling and arrived at the next station, 1, where it is removed, the tube is placed in a device combined with the machine (Figs. 1 and 3) for continued temperate cooling of the shaped tube ends in order to remove all remaining stresses in the glass after the shaping procedure. From a point above the machine and behind same are arranged two slanting U-iron beams 153 and 154, which are attached to the machine stand. At the ends of these U-iron beams a pair of horizontal shafts 155 and 156 are supported, which serve as supports for chain wheels 157 and 158, around which are placed chains 159, the links of which are fitted with lugs 160, between which the tubes are carried. On the front and rear frame beams 11, 12 and 162 respectively, in the stand of the machine and cooling device, are arranged two horizontal shafts 161 and 162', which support chain wheels 163 and 164, around which chains 165 are trained. These chains carry the tube back again to the front of the machine. As the movement is horizontal in this case, no special lugs for the tubes are required on these chains. The upper runs of the chains 165 are supported by rails 167, in the shape of angle-irons. To lead the tubes from the sloping conveyor 159 to the horizontal conveyor 165 guide rails 168 bent to arcuate shape are arranged at the transfer point. The tubes arrive at the front of the machine on a support consisting of flat iron bars 169.

The tubes move synchronously in the sloping conveyor with the movement of the tubes between working stations. For this purpose a cam 170 (Fig. 3) is attached to the end of shaft 20. Cam 170 is engaged by an arm 171, attached to a sleeve 173 pivotally supported by a pin 172. On the same sleeve 173, a pair of downwardly extending arms 174 and 175 are arranged, each of them connected with a link 176 and 177 respectively, of which link 176 is connected with an arm 178 on the conveyor shaft 156 and link 177 in the same way with an arm 179 on conveyor shaft 161. To each of these shafts a ratchet wheel is attached, with which a pawl on the corresponding arm engages. The conveyors 159 and 165 will thus move one step for every revolution of cam 170.

Figure 1:
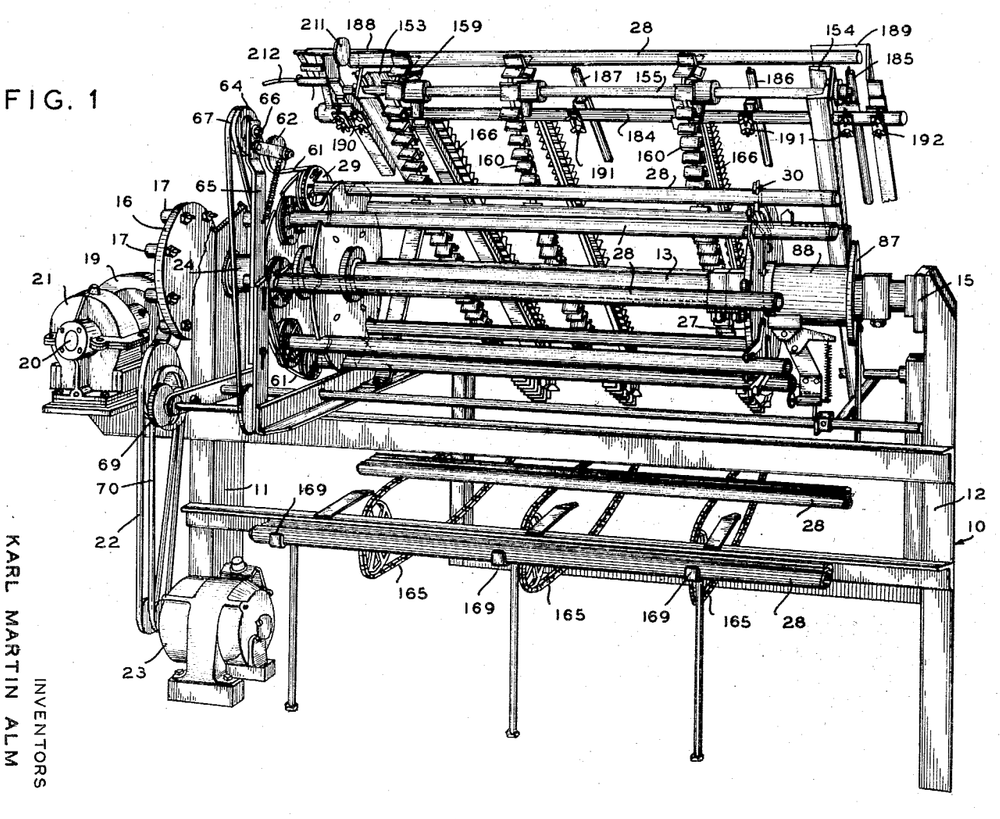
Fig. 1 is a perspective view of the machine from the front.

In the U-bars 153 and 154 are inserted a number of horizontal round iron bars 184 serving as supports partly for burners 185, 186 and 187 for heating the tube ends, and partly for windshields 188 and 189 over these burners. The burners consist of tubes with a row of holes for the flames. Fig. 1 shows also suitable attaching devices 190, 191 and 192 for angle irons 166, burners 185, 186, 187 and windshields 188 and 189.

The machine shown is intended for end-shaping of luminous tube envelopes, not only of varying diameters, but also of varying length. The clamping device to the right with burners, cutting-off device and end-shaping device is therefore arranged so that it can be moved to different positions along the main shaft. For this purpose, a longitudinal key 193 is attached, and the sleeve 25 for disc 27 supporting tube holder 30 is provided with a keyway in engagement with this strip. The sleeve can thus be moved without turning the support for the tube holder in relation to the main shaft. Sleeve 25 is fastened to the shaft by means of locking bolts 194. Hub 88, which supports end-shaping unit 100' and flange 87 with the cutting device and the burners (Figs. 2 and 8) to the right, is journalled on sleeve 25 and is held axially in position between disc 27 and stop ring 180 fitted with a set screw 181 and thus attached to sleeve 25. Hub 88 is locked against turning by an arm 198 extending downwardly from flange 87, at the end of which is an adjustable pin 200 engaging a longitudinal beam 199. For convenience in placing the tube 28 accurately in the conveyor 159, there is provided a reciprocating stop plate 211 to the left of the conveyor. This plate is reciprocated via a Bowden cable 212 from a cam (not shown) with wave-shaped profile, attached to the shaft 20. The movement of the stop plate 211 serves to prevent contact of long duration with the hot tube end.

As it is possible that a tube will not be properly cut-off, a feeler (not shown) is disposed after the cutting-off station, which actuates a relay for stopping rotation of the main shaft, for instance by switching off the current to motor 23 with the result that this tube does not cause damage to the following mechanism. The arrangement must be such that the conveyors with shaped tubes on the same cannot be stopped, which would result in the flames from the burners melting the tube ends. This can be accomplished by providing an auxiliary motor for the conveyors, which is started automatically, when main motor 23 is switched off.

In order to make the tubes rotate when passing the burners in the conveyor, strips (not shown) covered with suitable friction material can be arranged in parallel with angle iron supports 166, which the tubes frictionally engage during their passage along the same.

In the machine shown with 8 positions, 500 tubes can be end-shaped per hour, the machine being operated by one man only. By increasing the number of positions, production can be increased, if required.

The machine is also suitable for use with automatic feeding means for removing treated tubes and inserting new ones. The principles for such automatic insertion and removal are known in other connections in the manufacture of lamps. By such automatic feeding means production can, of course, be increased still more.

In the end-shaping machine for luminous tubes as shown the tubes are moved on a circular path. But in principle the machine can be modified for moving the tubes during machining in a closed periphery of some other shape, for instance such as can be obtained with the aid of chain conveyors as in the case of the unit for temperate cooling of the shaped tube ends. One single conveyor can thus move the tubes in the complete circulation described above.

The holders clamping the tubes against axial as well as against radial movement are, as already mentioned, screwed into their sockets. Therefore they are exchangeable so that the same machine can be used for treating tubes of different diameters.

Having thus described our invention, what we claim and desire to secure by Letters Patent is:

1. Glass tube working apparatus comprising in combination a frame, a shaft rotatably supported on said frame, glass tube carrier means including first and second turrets mounted on said shaft, said first turret being fixed to said shaft, said second turret being movable toward and away from said first turret to accommodate tubes of different lengths, a plurality of tube gripping means rotatably mounted on said first turret, each gripping means including clamping elements pivotally mounted thereon, resilient means for urging said clamping elements into engagement with a tube to retain the same against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, each holding means comprising a pair of rollers rotatably mounted on said second turret and a third roller carried by an arm pivotally mounted on said second turret and resiliently urged toward said pair of rollers to engage and rotatably support a tube therebetween, means to intermittently rotate said shaft and turrets to move said gripping means and said holding means from a loading station to successive working stations and back to said loading station, independent cam means operatively associated with said gripping means and said holding means for moving said clamping elements and said third roller out of engagement with a tube at said loading station to permit removal of a completed tube and insertion of a new tube to be operated upon, means comprising a flexible driving element for engaging and rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube, and cooling means for suddenly cooling said heated section to cause breakage of said tube at said section, tube end heating means at successive stations following said cutoff station, a tube end shaping station following the last heating station, tube end shaping means at said shaping station for simultaneously shaping opposite ends of said tube, said shaping means including inner and outer shaping rollers movable into and out of engagement with the ends of said tube and successive tube end cooling stations following said shaping station.

2. Glass tube working apparatus comprising in combination a frame, a shaft rotatably supported on said frame, glass tube carrier means including first and second turrets mounted on said shaft, a plurality of tube gripping means rotatably mounted on said first turret, each gripping means including clamping elements pivotally mounted thereon, resilient means for urging said clamping elements into engagement with a tube to retain the same against axaial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, each holding means comprising a pair of rollers rotatably mounted on said second turret and a third roller carried by an arm pivotally mounted on said second turret and resiliently urged toward said pair of rollers to engage and rotatably support a tube therebetween, means to intermittently rotate said shafts and turrets to move said gripping means and said holding means from a loading station to successive working stations and back to said loading station, independent cam means operatively associated with said gripping means and said holding means for moving said clamping elements and said third roller out of engagement with a tube at said loading station to permit removal of a completed tube and insertion of a new tube to be operated upon, means comprising a flexible driving element for engaging and rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube, said shaping means including inner and outer shaping rollers movable into and out of engagement with the ends of said tube, and successive tube end cooling stations following said shaping station.

3. Glass tube working apparatus comprising in combination a frame, a shaft rotatably supported on said frame, glass tube carrier means including first and second turrets mounted on said shaft, a plurality of tube gripping means rotatably mounted on said first turret, each gripping means including clamping elements pivotally mounted thereon, resilient means for urging said clamping elements into engagement with a tube to retain the same against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, each holding means comprising a pair of rollers rotatably mounted on said second turret and a third roller carried by an arm pivotally mounted on said second turret and resiliently urged toward said pair of rollers to engage and rotatably support a tube therebetween, means to intermittently rotate said shaft and turrets to move said gripping means and said holding means from a loading station to successive working stations and back to said loading station, independent cam means operatively associated with said gripping means and said holding means for moving said clamping elements and said third roller out of engagement with a tube at said loading station to permit removal of the completed tube and insertion of a new tube to be operated upon, means for rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube, and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube, said shaping means including inner and outer shaping rollers movable into and out of engagement with the ends of said tube and successive tube end cooling stations following said shaping station.

4. Glass tube working apparatus comprising in combination a frame, a shaft rotatably supported on said frame, glass tube carrier means including first and second turrets mounted on said shaft, a plurality of tube gripping means rotatably mounted on said first turret, each gripping means including clamping elements pivotally mounted thereon, resilient means for urging said clamping elements into engagement with a tube to retain the same against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, each holding means comprising a pair of rollers rotatably mounted on said second turret and a third roller carried by an arm pivotally mounted on said second turret and resiliently urged toward said pair of rollers to engage and rotatably support a tube therebetween, means to intermittently rotate said shaft and turrets to move said gripping means and said holding means from a loading station to successive working stations and back to said loading station, means operatively associated with said gripping means and said holding means for moving said clamping elements and said third roller out of engagement with a tube at said loading station to permit removal of a completed tube and insertion of a new tube to be operated upon, means for rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube, and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube, said shaping means including inner and outer shaping rollers movable into and out of engagement with the ends of said tube and successive tube end cooling stations following said shaping station.

5. Glass tube working apparatus comprising in combination a frame, a shaft rotatably supported on said frame, glass tube carrier means including first and second turrets mounted on said shaft, a plurality of tube gripping means rotatably mounted on said first turret, each gripping means including clamping elements pivotally mounted thereon, resilient means for urging said clamping elements into engagement with a tube to retain the same against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, each holding means comprising a pair of rollers rotatably mounted on said second turret and a third roller carried by an arm pivotally mounted on said second turret and resiliently urged toward said pair of rollers to engage and rotatably support a tube therebetween, means to intermittently rotate said shaft and turrets to move said gripping means and said holding means from a loading station to successive working stations and back to said loading station, means operatively associated with said gripping means and said holding means for moving said clamping elements and said third roller out of engagement with a tube at said loading station to permit removal of a completed tube and insertion of a new tube to be operated upon, means for rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube, and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube, said shaping means including shaping rollers movable into and out of engagement with the ends of said tube and successive tube end cooling stations following said shaping station.

6. Glass tube working apparatus comprising in combination a frame, a shaft rotatably supported on said frame, glass tube carrier means including first and second turrets mounted on said shaft, a plurality of tube gripping means rotatably mounted on said first turret, each gripping means including clamping elements pivotally mounted thereon, resilient means for urging said clamping elements into engagement with a tube to retain the same against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, each holding means comprising a pair of rollers rotatably mounted on said second turret and a third roller carried by an arm pivotally mounted on said second turret and resiliently urged toward said pair of rollers to engage and rotatably support a tube therebetween, means to intermittently rotate said shaft and turrets to move said gripping means and said holding means from a loading station to successive working stations and back to said loading station, means operatively associated with said gripping means and said holding means for moving said clamping elements and said third roller out of engagement with a tube at said loading station to permit removal of a completed tube and insertion of a new tube to be operated upon, means for rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube, and successive tube end cooling stations following said shaping station.

7. Glass tube working apparatus comprising in combination a frame, a shaft rotatably supported on said frame, glass tube carrier means including first and second turrets mounted on said shaft, a plurality of tube gripping means rotatably mounted on said first turret, each gripping means including clamping elements pivotally mounted thereon, resilient means for urging said clamping elements into engagement with a tube to retain the same against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, each holding means comprising rollers rotatably mounted on said second turret with one of said rollers resiliently urged into engagement with a tube, means to intermittently rotate said shaft and turrets to move said gripping means and said holding means from a loading station to successive working stations and back to said loading station, means operatively associated with said gripping means and said holding means for moving said clamping elements and said one roller out of engagement with a tube at said loading station to permit removal of a completed tube and insertion of a new tube to be operated upon, means for rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube, and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube, and successive tube end cooling stations following said shaping station.

8. Glass tube working apparatus comprising in combination a frame, a shaft rotatably supported on said frame, glass tube carrier means including first and second turrets mounted on said shaft, a plurality of tube gripping means rotatably mounted on said first turret, each gripping means including clamping elements pivotally mounted thereon, resilient means for urging said clamping elements into engagement with a tube to retain the same against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, means to intermittently rotate said shaft and turrets to move said gripping means and said holding means from a loading station to successive working stations and back to said loading station, means operatively associated with said gripping means and said holding means for moving said clamping elements and said holding means out of engagement with a tube at said loading station to permit removal of a completed tube and insertion of a new tube to be operated upon, means for rotating said gripping means and tubes carried thereby at all stations except to said loading station, a tube cut-off station immediately following said loading station, cut-off means at said cut-off station for simultaneously removing opposite ends of a tube, said cut-off means including a heater for heating a relatively narrow cross-section of said tube and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube and successive tube end cooling stations following said shaping station.

9. Glass tube working apparatus comprising in combination, a frame, a shaft rotatably supported on said frame, glass tube carrier means including first and second turrets mounted on said shaft, a plurality of tube gripping means rotatably mounted on said first turret, each gripping means including clamping elements resiliently urged into engagement with a tube to retain the same against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, means to intermittently rotate said shaft and turrets to move said gripping means and said holding means from a loading station to successive working stations and back to said loading station, means operatively associated with said gripping means and said holding means for moving said clamping elements and said holding means out of engagement with a tube at said loading station to permit removal of a completed tube and insertion of a new tube to be operated upon, means for rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube and cooling means for suddenly cooling said heated section to cause breakage of said tube at said section, tube end heating means at successive stations following said cut-off station, a tube end station following the last heating station, tube end shaping means at said shaping station for simultaneously shaping opposite ends of said tube, and successive tube end cooling stations following said shaping station.

10. Glass tube working apparatus comprising in combination, a frame, a shaft rotatably supported on said frame, glass tube carrier means including first and second turrets mounted on said shaft, a plurality of tube gripping means rotatably mounted on said first turret to retain a tube against axial and radial movement with respect to said gripping means and with said tube projecting through said gripping means, a plurality of tube holding means carried by said second turret in alignment with said gripping means whereby a tube extending through said gripping means and said holding means will be supported substantially parallel to said shaft, means to intermittently rotate said shaft and turrets to move said gripping means and said holding means from a loading station to successive working stations and back to said loading station, means operatively associated with said gripping means and said holding means to move said gripping and holding means out of engagement with a tube at said loading station to permit removal of a completed tube and insertion of a new tube to be operated upon, means for rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube, and successive tube end cooling stations following said shaping station.

11. Glass tube working apparatus comprising in combination, a frame, a shaft rotatably supported on said frame, glass tube carrier means including first and second turrets mounted on said shaft, a plurality of tube gripping means rotatably mounted on said first turret, a plurality of tube holding means carried by said second turret in alignment with said gripping means whereby a tube extending through said gripping means and said holding means will be supported substantially parallel to said shaft, means to intermittently rotate said shaft and turrets to move said gripping means and said holding means from a loading station to successive working stations and back to said loading station, means operatively associated with said gripping means and said holding means for moving said gripping means and said holding means out of engagement with a tube at said loading station to permit removal of a completed tube and insertion of a new tube to be operated upon, means for rotating said gripping means and tubes carried thereby at all stations except said loading station, a tube cut-off station immediately following said loading station, cut-off means at said cut-off station for simultaneously removing opposite ends of a tube, said cut-off means including a heater for heating a relatively narrow cross-section of said tube and cooling means for suddenly cooling said heated section to cause breakage of said tube at said section, tube end heating means at successive stations following said cut-off station, a tube end shaping station following the last heating station, tube end shaping means at said shaping station for simultaneously shaping opposite ends of said tube, and successive tube and cooling stations following said shaping station.

12. Glass tube working apparatus comprising in combination, a frame, a shaft rotatably supported on said frame, glass tube carrier means including first and second turrets mounted on said shaft, a plurality of tube gripping means rotatably mounted on said first turret, a plurality of tube holding means carried by said second turret in alignment with said gripping means whereby a tube extending through said gripping means and said holding means will be supported substantially parallel to said shaft, means to intermittently rotate said shaft and turrets to move said gripping means and said holding means from a loading station to successive working stations and back to said loading station, means operatively associated with said gripping means and said holding means for moving said gripping means and said holding means out of engagement with a tube at said loading station to permit removal of a completed tube and insertion of a new tube to be operated upon, means for rotating said gripping means and tubes carried thereby except at said loading station, a tube cut-off station immediately following said loading station, cut-off means at said cut-off station for simultaneously removing opposite ends of a tube, said cut-off means including a heater for heating a relatively narrow cross-section of said tube and cooling means for suddenly cooling said heated section to cause breakage of said tube at said section, tube end heating means at successive stations following said cut-off station, a tube end shaping station following the last heating station, tube end shaping means at said shaping station for simultaneously shaping the opposite ends of said tube, and successive tube end cooling stations following said shaping station.

13. Glass tube working apparatus comprising in combination, a frame, a shaft rotatably supported on said frame, glass tube carrier means including first and second turrets mounted on said shaft, a plurality of tube gripping means rotatably mounted on said first turret, a plurality of tube holding means carried by said second turret in alignment with said gripping means whereby a tube extending through said gripping means and said holding means will be supported substantially parallel to said shaft, means to intermittently rotate said shaft and turrets to move said gripping means and said holding means from a loading station to successive working stations and back to said loading stations, means operatively associated with said gripping means and said holding means for moving said gripping means and said holding means out of engagement with a tube at said loading station to permit removal of a completed tube and insertion of a new tube to be operated upon, means for rotating said gripping means and tubes carried thereby except at said loading station, a tube cut-off station immediately following said loading station, cut-off means at said cut-off station for simultaneously removing opposite ends of a tube, said cut-off means including a heater for heating a section of said tube and cooling means for suddenly cooling said heated section to cause breakage of said tube at that station, tube end heating means at successive stations following said cut-off station, a tube end shaping station following the last heating station, tube end shaping means at said shaping station for simultaneously shaping opposite ends of said tube, and successive tube end cooling stations following said shaping station.

14. Glass tube working apparatus comprising in combination, a frame, a shaft rotatably supported on said frame, glass tube carrier means including first and second turrets mounted on said shaft, a plurality of tube gripping means rotatably mounted on said first turret, a plurality of tube holding means carried by said second turret in alignment with said gripping means whereby a tube extending through said gripping means and said holding means will be supported substantially parallel to said shaft, means to intermittently rotate said shaft and turrets to move said gripping means and said holding means from a loading station to successive working stations and back to said loading station, means operatively associated with said gripping means and said holding means for moving said gripping means and said holding means out of engagement with a tube at said loading station to permit removal of a completed tube and insertion of a new tube to be operated upon, means for rotating said gripping means and tubes carried thereby except at said loading station, a tube cut-off station immediately following said loading station, cut-off means at said cut-off station for simultaneously removing opposite ends of a tube, tube end heating means at successive stations following said cut-off station, a tube end shaping station following the last heating station, tube end shaping means at said shaping station for simultaneously shaping opposite ends of said tube and successive tube end cooling stations following said shaping station.

15. Glass tube working apparatus comprising in combination, a frame, a shaft rotatably supported on said frame, glass tube carrier means including first and second turrets mounted on said shaft, a plurality of tube gripping means rotatably mounted on said first turret, a plurality of tube holding means carried by said second turret in alignment with said gripping means whereby a tube extending through said gripping means and said holding means will be supported substantially parallel to said shaft, means to intermittently rotate said shaft and turrets to move said gripping means and said holding means from a loading station to successive working stations and back to said loading station, means operatively associated with said gripping means and said holding means for moving said gripping means and said holding means out of engagement with a tube at said loading station to permit removal of a completed tube and insertion of a new tube to be operated upon, means for rotating said tubes except at said loading station, a tube cut-off station immediately following said loading station, cut-off means at said cut-off station for simultaneously removing opposite ends of a tube, tube end heating means at successive stations following said cut-off station, a tube end shaping station following the last heating station, tube end shaping means at said shaping station for simultaneously shaping opposite ends of said tube and successive tube end cooling stations following said shaping station.

16. Glass tube working apparatus as defined in claim 14 in which said tube gripping means comprises two rings mounted for relative rotation one within the other, clamping elements comprising annularly spaced pairs of links, each pair being pivoted together at their inner ends with the outer end of one link pivoted to one ring and the outer end of the other link pivoted to the other ring whereby upon the relative rotation of said rings the inner pivotally connected ends of each pair of links will be moved radially inward and outward, the side surfaces of the outer ends of said links adjacent their pivotal connection with said rings being chamfered to permit limited swinging movement of said links axially with respect to the axis of said rings, tension springs connecting said rings to rotate the same in a direction to move the connected ends of said links inwardly to engage a tube, ratchet teeth on each ring and cam actuated pawls for engaging said ratchet teeth to rotate said rings in a direction to move the connected ends of said links outwardly to release a tube.

17. Glass tube working apparatus as defined in claim 14 in which said tube gripping means comprises two rings mounted for relative rotation one within the other, clamping elements comprising annularly spaced pairs of links, each pair being pivoted together at their inner ends with the outer end of one link pivoted to one ring and the outer end of the other link pivoted to the other ring whereby upon the relative rotation of said rings the inner pivotally connected ends of each pair of links will move radially inward and outward, the side surfaces of the outer ends of said links adjacent their pivotal connection with said rings being chamfered to permit limited swinging movement of said links axially with respect to the axis of said rings, resilient means connecting said rings to rotate the same in a direction to move the connected ends of said links inwardly to engage a tube, ratchet teeth on each ring and cam actuated pawls for engaging said ratchet teeth to rotate said rings in a direction to move the connected ends of said links outwardly to release a tube.

18. Glass tube working apparatus as defined in claim 14 in which said tube gripping means comprises two rings mounted for relative rotation one within the other, clamping elements comprising annularly spaced pairs of links, each pair being pivoted together at their inner ends with the outer end of one link pivoted to one ring and the outer end of the other link pivoted to the other ring whereby upon the relative rotation of said rings the inner pivotally connected ends of each pair of links will move radially inward and outward, resilient means connecting said rings to rotate the same in a direction to move the connected ends of said links inwardly to engage a tube, ratchet teeth on each ring and cam actuated pawls for engaging said ratchet teeth to rotate said rings in a direction to move the connected ends of said links outwardly to release a tube.

19. Glass tube working apparatus as defined in claim 14 in which said tube gripping means comprises two rings mounted for relative rotation one within the other, clamping elements comprising annularly spaced pairs of links, each pair being pivoted together at their inner ends with the outer end of one link pivoted to one ring and the outer end of the other link pivoted to the other ring whereby upon relative rotation of said rings the inner pivotally connected ends of each pair of links will move radially inward and outward, means to rotate said rings in a direction to move the connected ends of said links inwardly to engage a tube, ratchet teeth on each ring, and cam actuated pawls for engaging said ratchet teeth to rotate said rings in a direction to move the connected ends of said links outwardly to release a tube.

20. Glass tube working apparatus as defined in claim 14 in which said tube gripping means comprises two rings mounted for relative rotation one within the other, clamping elements comprising annularly spaced pairs of links, each pair being pivoted together at their inner ends with the outer end of one link pivoted to one ring and the outer end of the other link pivoted to the other ring whereby upon relative rotation of said rings the inner pivotally connected ends of each pair of links will move radially inward and outward, means to rotate said rings in a direction to move the connected ends of said links inwardly to engage a tube and cam actuated means for rotating said rings in a direction to move the connected ends of said links outwardly to release a tube.

21. Glass tube working apparatus as defined in claim 14 in which said tube gripping means comprises two rings mounted for relative rotation one within the other, clamping elements comprising annularly spaced pairs of links, each pair being pivoted together at their inner ends with the outer end of one link pivoted to one ring and the outer end of the other link pivoted to the other ring whereby upon relative rotation of said rings the inner pivotally connected ends of each pair of links will move radially inward and outward, means to rotate said rings in a direction to move the connected ends of said links inwardly to engage a tube and means for rotating said rings in a direction to move the connected ends of said links outwardly to release a tube.

22. Glass tube working apparatus as defined in claim 14 in which said cut-off means comprises a burner for projecting a narrow flame against the surface of the tube to heat a relatively narrow cross-section of the same, and cooling means comprising a body having a relatively narrow edge for engagement with the heated cross-section of said tube, a recess in said body, means for supplying a cooling medium to said recess and resilient means for holding the edge of said body in engagement with said tube, the sudden cooling of said heated cross-section causing breakage of the tube at that point.

23. Glass tube working apparatus as defined in claim 14 in which said cut-off means comprises a burner for projecting a narrow flame against the surface of the tube to heat a relatively narrow cross-section of the same and cooling means comprising a body having a relatively narrow edge for engagement with the heated cross-section of said tube, a recess in said body and means for supplying a cooling medium to said recess, the sudden cooling of said heated cross-section causing breakage of the tube at that point.

24. Glass tube working apparatus as defined in claim 14 in which said cut-off means comprises a burner for projecting a narrow flame against the surface of the tube to heat a relatively narrow cross-section of the same, cooling means comprising a body having a relatively narrow edge for engagement with the heated cross-section of said tube and means for cooling said body, the sudden cooling of said heated cross-section causing breakage of the tube at that point.

25. Glass tube working apparatus as defined in claim 14 in which said tube end shaping means comprises a bracket supported from said frame, a downwardly extending arm pivotally mounted on said bracket, an inner shaping roll carried by said arm, a bearing pivotally mounted on the lower end of said arm, an outer shaping roll carried by said bearing, means for adjusting the spacing between said rolls, a tension spring for urging said arm and inner roll away from a tube end, a relatively stronger tension spring for urging said outer roll away from said inner roll and means engaging said bearing to move said inner roll within said tube end and said outer roll toward said inner roll and into engagement with the outer surface of said tube end, the relative strength of said springs causing said inner roll to move within said tube end prior to engagement of said outer roll with said tube end.

26. Glass tube working apparatus as defined in claim 14 in which said tube end shaping means comprises a bracket supported from said frame, a downwardly extending arm pivotally mounted on said bracket, an inner shaping roll carried by said arm, a bearing pivotally mounted on the lower end of said arm, an outer shaping roll carried by said bearing, means for adjusting the spacing between said rolls, resilient means for urging said arm and inner roll away from a tube end, a relatively stronger resilient means for urging said outer roll away from said inner roll and means engaging said bearing to move said inner roll within said tube end and said outer roll toward said inner roll and into engagement with the outer surface of said tube end, the relative strength of said resilient means causing said inner roll to move within said tube end prior to engagement of said outer roll with said tube end.

27. Glass tube working apparatus as defined in claim 14 in which said tube end shaping means comprises a bracket, an arm pivotally mounted on said bracket, an inner shaping roll carried by said arm, a bearing pivotally mounted on said arm, an outer shaping roll carried by said bearing, means for adjusting the spacing between said rolls, resilient means for urging said arm and inner roll away from a tube end, a relatively stronger resilient means for urging said outer roll away from said inner roll and means for engaging said bearing to move said inner roll within said tube end and said outer roll toward inner roll and into engagement with the outer surface of said tube end, the relative strength of said resilient means causing said inner roll to move within said tube end prior to engagement of said outer roll with said tube end.

28. Glass tube working apparatus as defined in claim 14 in which said tube end shaping means comprises a bracket, an arm pivotally mounted on said bracket, an inner shaping roll carried by said arm, a bearing pivotally mounted on said arm, an outer shaping roll carried by said bearing, resilient means for urging said arm and inner roll away from a tube end, a relatively stronger resilient means for urging said outer roll away from said inner roll and means for engaging said bearing to move said inner roll within said tube end and said outer roll toward said inner roll and into engagement with the outer surface of said tube end, the relative strength of said resilient means causing said inner roll to move within said tube end prior to engagement of said outer roll with said tube end.

References Cited in the file of this patent

UNITED STATES PATENTS

| Number | Name | Date |
| --- | --- | --- |
| 1,338,941 | Lindahl | May 4, 1920 |
| 1,493,044 | Leiman | May 6, 1924 |
| 2,125,017 | Halverson | July 26, 1938 |
| 2,258,408 | Cozzoli | Oct. 7, 1941 |
| 2,266,417 | Eisler | Dec. 16, 1941 |
| 2,284,089 | Hahn et al. | May 26, 1942 |
| 2,323,182 | Stuckert | June 29, 1943 |
| 2,364,673 | Stuckert | Dec. 12, 1944 |
| 2,394,115 | Snyder | Feb. 5, 1946 |
| 2,446,000 | Eisler | July 27, 1948 |
| 2,534,547 | Eisler | Dec. 19, 1950 |

FOREIGN PATENTS

| Number | Country | Date |
| --- | --- | --- |
| 419,614 | Germany | Sept. 19, 1922 |